US011095200B2

(12) United States Patent
Kitahara et al.

(10) Patent No.: US 11,095,200 B2
(45) Date of Patent: Aug. 17, 2021

(54) ACTUATOR

(71) Applicant: NIDEC SANKYO CORPORATION, Nagano (JP)

(72) Inventors: Hiroshi Kitahara, Nagano (JP); Tadashi Takeda, Nagano (JP); Masao Tsuchihashi, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 151 days.

(21) Appl. No.: 16/499,314

(22) PCT Filed: Mar. 23, 2018

(86) PCT No.: PCT/JP2018/011584
§ 371 (c)(1),
(2) Date: Sep. 29, 2019

(87) PCT Pub. No.: WO2018/180945
PCT Pub. Date: Oct. 4, 2018

(65) Prior Publication Data
US 2020/0059148 A1    Feb. 20, 2020

(30) Foreign Application Priority Data

Mar. 30, 2017  (JP) .............................. JP2017-068655

(51) Int. Cl.
*H02K 33/00*  (2006.01)
*H02K 33/16*  (2006.01)
*H01F 7/08*  (2006.01)
*H01F 7/126*  (2006.01)

(52) U.S. Cl.
CPC ............. *H02K 33/16* (2013.01); *H01F 7/081* (2013.01); *H01F 7/126* (2013.01)

(58) Field of Classification Search
CPC .... H02K 33/00–33/18; H02K 2201/18; B06B 1/045
See application file for complete search history.

(56) References Cited

U.S. PATENT DOCUMENTS

2005/0140215 A1    6/2005  Korenaga

FOREIGN PATENT DOCUMENTS

| CN | 203343048 | 12/2013 |
| CN | 205725401 | 11/2016 |
| CN | 106471719 | 3/2017 |
| EP | 1017155 | 7/2000 |

(Continued)

OTHER PUBLICATIONS

"Office Action of China Counterpart Application", dated Oct. 9, 2020, with English translation thereof, pp. 1-10.

(Continued)

*Primary Examiner* — Ramon M Barrera
(74) *Attorney, Agent, or Firm* — JCIPRNET

(57) ABSTRACT

An actuator (1) is provided A substrate (15) held by a support (2) is provided with a total of six power supply electrodes (153) electrically connected respectively to both ends of a first coil (61) of a first magnetic drive circuit (6) that vibrates a movable body (3) in an X direction, both ends of a second coil (71) of a second magnetic drive circuit (7) that vibrates the movable body (3) in a Y direction, and both ends of a third coil (81) of a third magnetic drive circuit (8) that vibrates the movable body (3) in the X direction. An opening (110) that exposes the six power supply electrodes (153) is formed in a cover (11).

15 Claims, 9 Drawing Sheets

(56) References Cited

FOREIGN PATENT DOCUMENTS

| | | |
|---|---|---|
| JP | H03296112 | 12/1991 |
| JP | 2011250637 | 12/2011 |
| JP | 2013243883 | 12/2013 |
| JP | 2015130754 | 7/2015 |
| JP | 2016127789 | 7/2016 |
| WO | 2010103831 | 9/2010 |
| WO | 2016167297 | 10/2016 |

OTHER PUBLICATIONS

"International Search Report (Form PCT/ISA/210) of PCT/JP2018/011584", dated May 22, 2018, with English translation thereof, pp. 1-4.

ACTUATOR

CROSS-REFERENCE TO RELATED APPLICATION

This application is a 371 application of the international PCT application Ser. No. PCT/JP2018/011584, filed on Mar. 23, 2018, which claims the priority benefit of Japan application no. 2017-068655, filed on Mar. 30, 2017. The entirety of each of the above-mentioned patent applications is hereby incorporated by reference herein and made a part of this specification.

BACKGROUND

Technical Field

The present invention relates to an actuator for generating various vibrations.

Related Art

As an apparatus for generating vibration by a magnetic drive mechanism, there has been proposed an actuator having a support provided with a magnet, a movable body provided with a coil opposed to the magnet in a first direction, and an elastic member disposed between the movable body and the support (refer to Patent Literature 1). Further, in the actuator described in Patent Literature 1, first magnetic drive circuits for linearly driving the movable body in a second direction orthogonal to a first direction are provided at two places spaced apart in the first direction, and second magnetic drive circuits for linearly driving the movable body in a third direction orthogonal to the first direction and crossing the second direction are provided at two places in the second direction.

LITERATURE OF RELATED ART

Patent Literature

[Patent Literature 1] Japanese Laid-Open Publication No. 2016-127789

SUMMARY

In the actuator described in Patent Literature 1, when vibrating the movable body in the second direction and in the third direction, drive signals of the same waveform are applied to coils used for the two first magnetic drive circuits, and drive signals of the same waveform are applied to coils used for the two second magnetic drive circuits. Therefore, a configuration is adopted in which power supply electrodes for the coils used in the two first magnetic drive circuits are made common, and power supply electrodes for the coils used in the two second magnetic drive circuits are made common. On the other hand, Patent Literature 1 proposes causing the movable body to perform an operation of reciprocating and rotating around an axis orthogonal to the second direction by applying an alternating current of reverse phase to the coils used in the two first magnetic drive circuits. However, when the power supply electrodes are made common as described above, it is difficult to apply the alternating current of the reverse phase to the coils used in the two first magnetic drive circuits. Therefore, in order to cause the movable body to reciprocate and rotate around the axis orthogonal to the second direction, it is necessary to switch the wiring connection between the coils and the circuits. Accordingly, it is not easy to rotationally drive the movable body around the axis orthogonal to the second direction.

In view of the above problems, it is an object of the present invention to provide an actuator capable of supplying an arbitrary drive signal to each of coils of a plurality of magnetic drive circuits.

MEANS FOR SOLVING THE PROBLEMS

In order to solve the above problem, the actuator according to the present invention includes a support, a movable body movable with respect to the support, a first magnetic drive circuit that includes a first col and a first magnet facing each other in a first direction, and generates a driving force to drive the movable body in a second direction orthogonal to the first direction, a second magnetic drive circuit that includes a second coil and a second magnet facing each other in the first direction, and generates a driving force to drive the movable body in the second direction orthogonal to the first direction, a third magnetic drive circuit including a third coil and a third magnet facing each other in the first direction at a position spaced apart from the first magnetic drive circuit, the third magnetic drive circuit generating a driving force to drive the movable body in a third direction, which is orthogonal to the first direction and crosses the second direction, a substrate held in the support. The substrate is provided with a first power supply electrode electrically connected to one end of the first coil, a second power supply electrode electrically connected to the other end of the first coil, a third power supply electrode electrically connected to one end of the second coil, a fourth power supply electrode electrically connected to the other end of the second coil, a fifth power supply electrode electrically connected to one end of the third coil, and a sixth power supply electrode electrically connected to the other end of the third coil.

According to the present invention, the substrate held by the support is provided with the first power supply electrode electrically connected to one end of the first coil, the second power supply electrode electrically connected to the other end of the first coil, the third power supply electrode electrically connected to one end of the second coil, the fourth power supply electrode electrically connected to the other end of the second coil, the fifth power supply electrode electrically connected to one end of the third coil, and the sixth power supply electrode electrically connected to the other end of the third coil. Therefore, when a drive signal is supplied to the first coil through the first electrode and the second electrode, the same drive signal as a drive vibration supplied to the first coil can be supplied to the third coil. Further, when the drive signal is supplied to the first coil through the first electrode and the second electrode, an arbitrary drive signal different in waveform from the drive vibration supplied to the first coil can be supplied to the third coil through the fifth power supply electrode and the sixth power supply electrode. Therefore, a complex drive combining a drive based on the drive signal supplied to the first coil and a drive based on the drive signal supplied to the third coil can easily be performed on the movable body.

The present invention can adopt an aspect in which the support includes a cover covering the movable body, the first magnetic drive circuit, the second magnetic drive circuit, and the third magnetic drive circuit, and the cover has an opening that exposes the first power supply electrode, the second power supply electrode, the third power supply electrode, the fourth power supply electrode, the fifth power supply electrode, and the sixth power supply electrode. According to this aspect, even when the cover is provided, a complex drive combining the drive based on the drive signal supplied to the first coil and the drive based on the drive signal supplied to the third coil can easily be performed on the movable body.

The present invention can adopt an aspect in which wires are independently connected to the first power supply electrode, the second power supply electrode, the third power supply electrode, the fourth power supply electrode, the fifth power supply electrode, and the sixth power supply electrode.

The present invention can adopt an aspect in which a first coil driving signal applied to the first coil through the first power supply electrode and the second power supply electrode, and a third coil driving signal applied to the third coil through the fifth power supply electrode and the sixth power supply electrode have different waveforms. For example, an aspect in which the first coil drive signal and the third coil drive signal have waveforms of opposite phases, and the first magnetic drive circuit and the third magnetic drive circuit generate the respective driving forces to drive the movable body in opposite directions in the second direction can be adopted.

The present invention can adopt an aspect in which the first magnetic drive circuit, the second magnetic drive circuit, and the third magnetic drive circuit are arranged to be sequentially stacked from one side to the other side in the first direction. According to this aspect, the size (planar area) of the actuator when viewed from the first direction can be reduced.

The present invention can adopt an aspect in which a magnetic center position of the second magnetic drive circuit coincides with or substantially coincides with a position of the center of gravity of the movable body in the first direction, the second direction, and the third direction, and a magnetic center position obtained by combining a magnetic center position of the first magnetic drive circuit and a magnetic center position of the third magnetic drive circuit coincides with or substantially coincides with the position of the center of gravity of the movable body in the first direction, the second direction, and the third direction. According to this aspect, when the movable body is driven in the second direction or the third direction, it is possible to avoid a situation such as inclination of the movable body.

DESCRIPTION OF THE EMBODIMENTS

Embodiments of the present invention will be described with reference to the drawings. In the following description, three directions crossing each other will be described as an X direction, a Y direction, and a Z direction. The Z direction is a direction orthogonal to the X direction and the Y direction. Further, a description will be given in which X1 is given to one side in the X direction, X2 is given to the other side in the X direction, Y1 is given to one side in the Y direction, Y2 is given to the other side in the Y direction, Z1 is given to one side in the Z direction, and Z2 is given to the other side in the Z direction. Here, the X direction, the Y direction and the Z direction each have the following relationship with the direction in the present invention.

Figure 1:
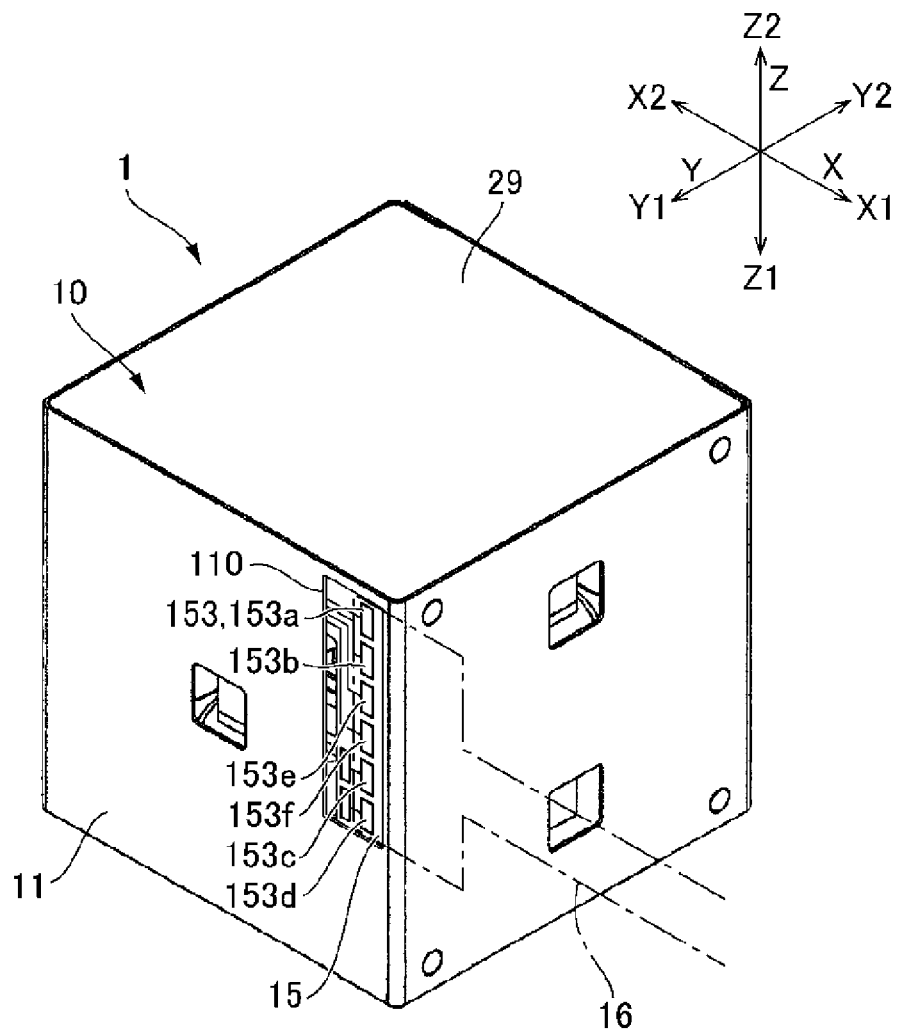
FIG. 1 is a perspective view of an actuator to which the present invention is applied.

X direction="second direction" in the present invention
Y direction="third direction" in the present invention
Z direction="first direction" in the present invention Overall Configuration FIG. 1 is a perspective view of an actuator 1 to which the present invention is applied.

Figure 2:
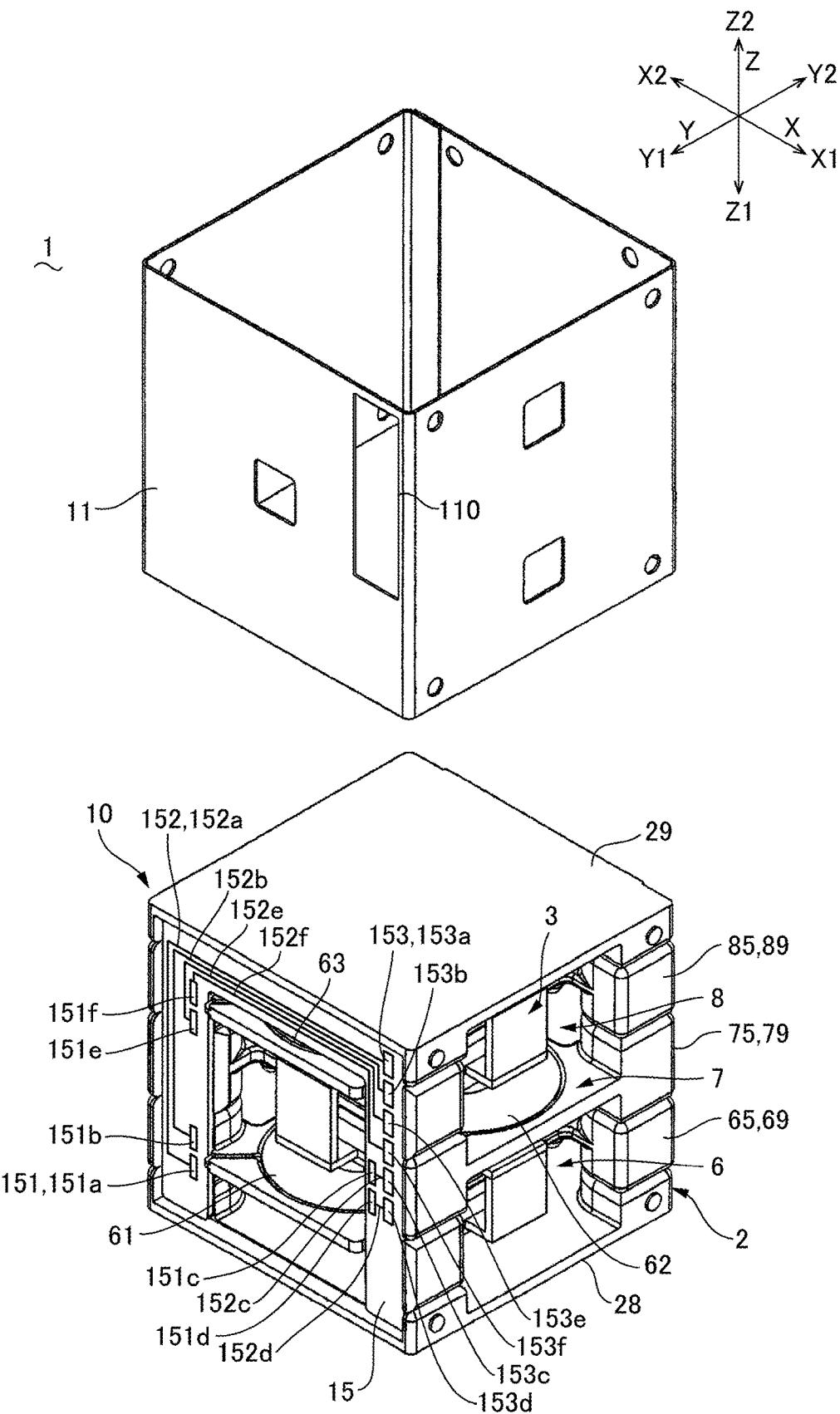
FIG. 2 is an exploded perspective view of the actuator in a state in which a cover shown in FIG. 1 is removed.
Figure 3:
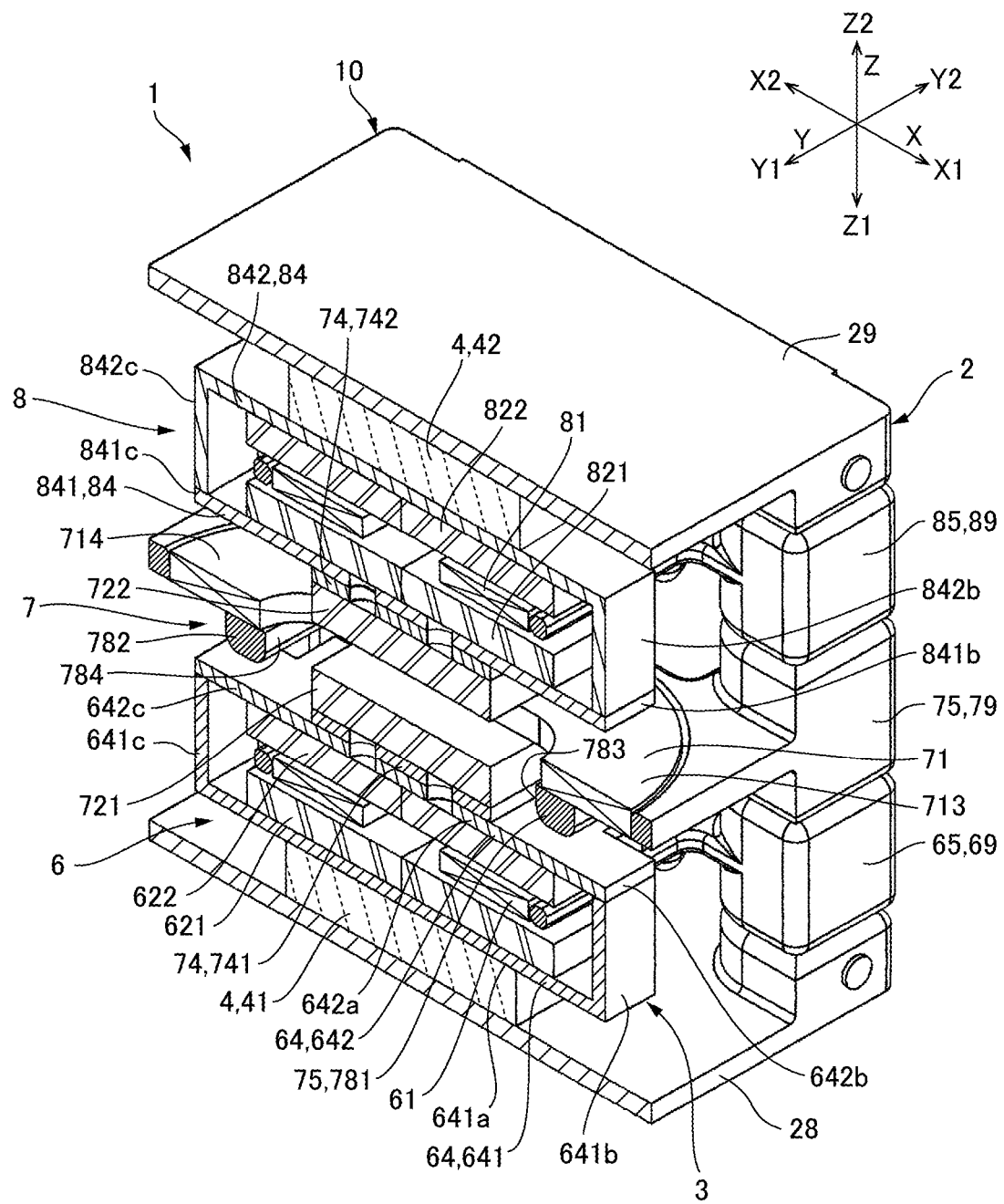
FIG. 3 is an explanatory diagram when the actuator shown in FIG. 1 is cut in a first direction and a second direction.
Figure 4:
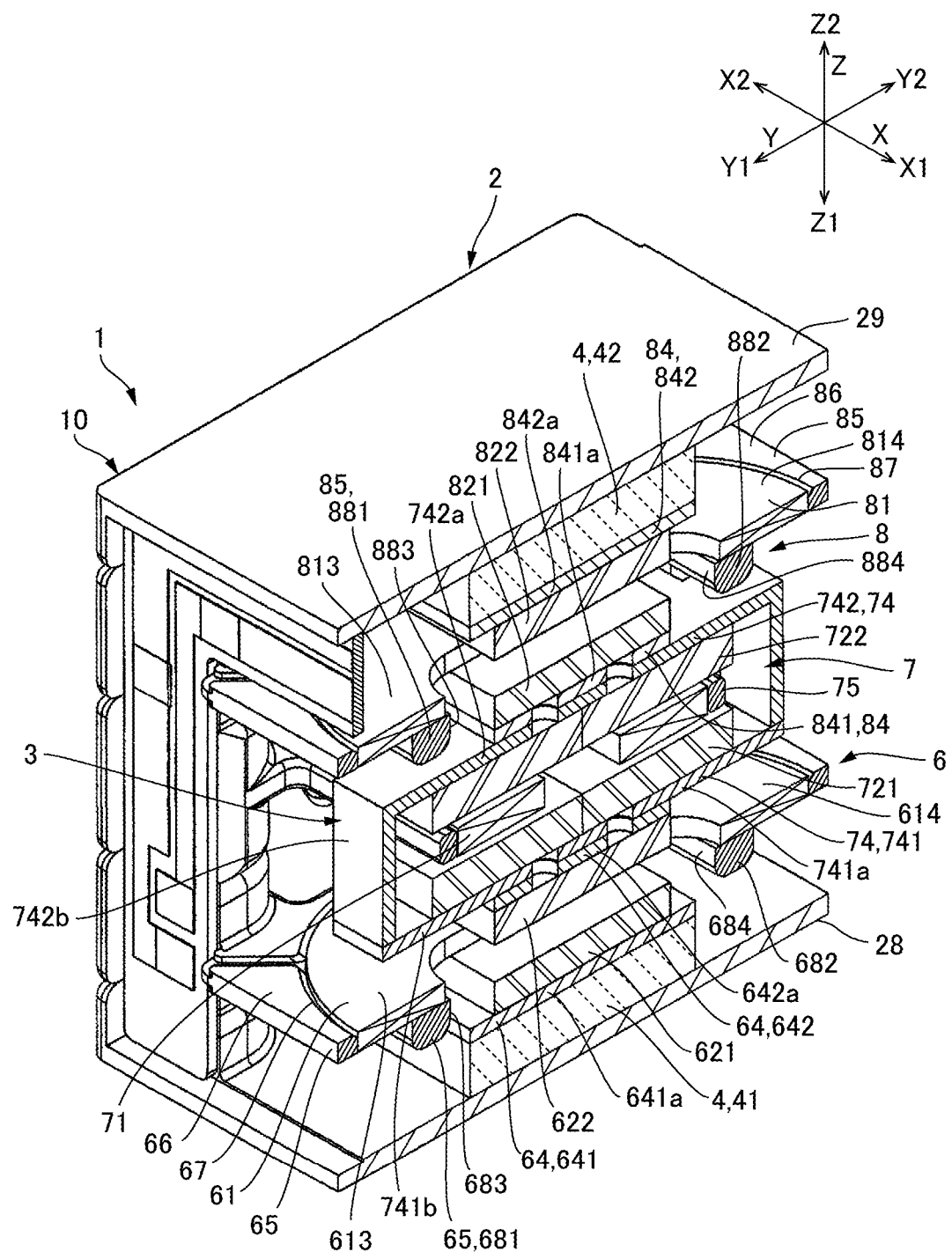
FIG. 4 is an explanatory diagram when the actuator shown in FIG. 1 is cut in the first direction and a third direction.
Figure 5:
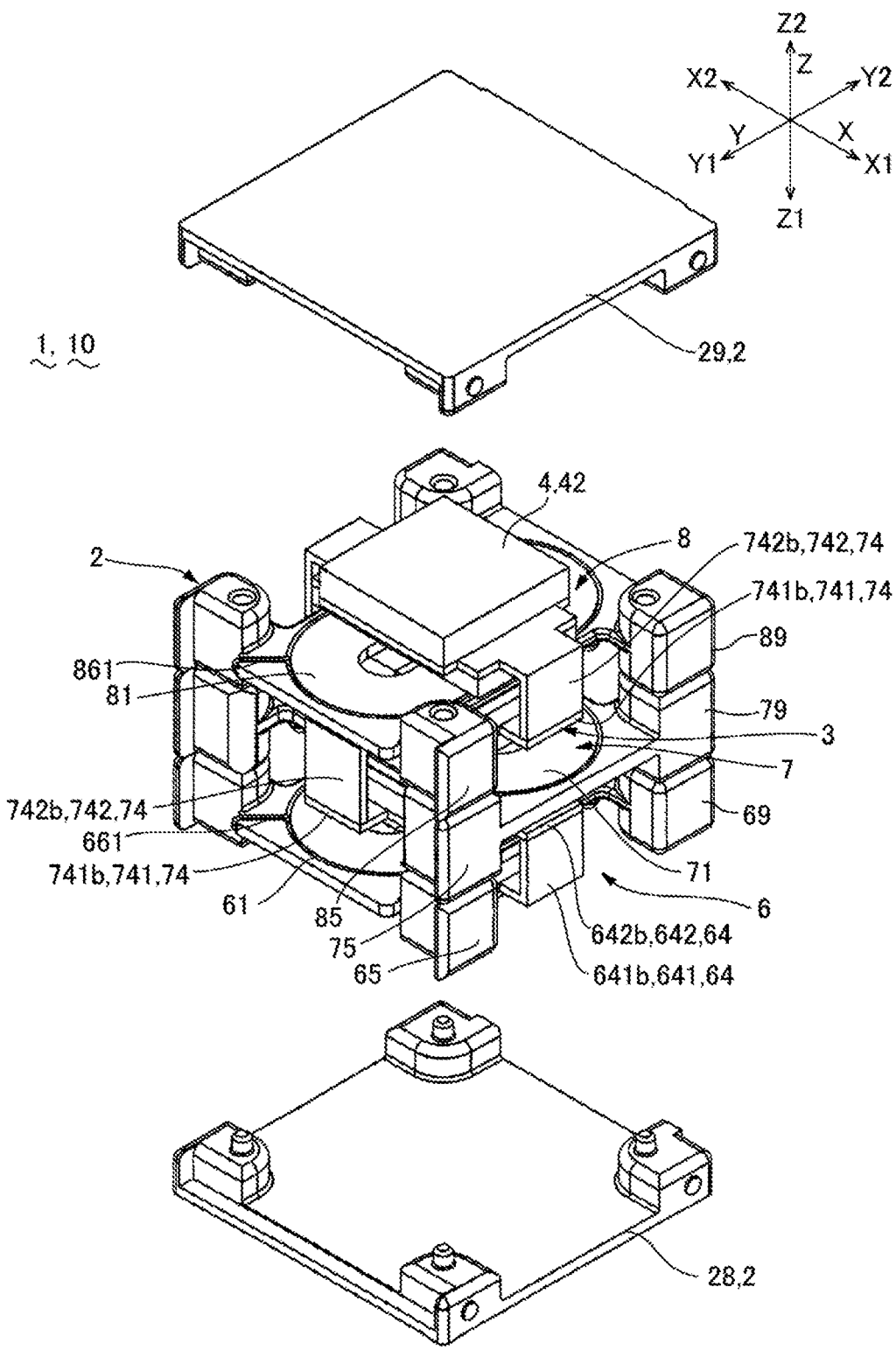
FIG. 5 is an exploded perspective view of the actuator in a state in which a first end plate and a second end plate shown in FIG. 2 are removed.

FIG. 2 is an exploded perspective view of the actuator 1 in a state in which a cover 11 shown in FIG. 1 is removed. FIG. 3 is an explanatory diagram when the actuator 1 shown in FIG. 1 is cut in the first direction (Z direction) and the second direction (X direction). FIG. 4 is an explanatory diagram when the actuator 1 shown in FIG. 1 is cut in the first direction (Z direction) and the third direction (Y direction). FIG. 5 is an exploded perspective view of the actuator 1 in a state in which a first end plate 28 and a second end plate 29 shown in FIG. 2 are removed.

As shown in FIGS. 1 and 2, the actuator 1 in the present embodiment includes the cover 11 having a rectangular cylindrical shape opened in the Z direction, a body portion 10 having a rectangular parallelepiped shape housed inside the cover 11, and a substrate 15 attached to a surface of one side Y1 of the body portion 10 in the Y direction (third direction). A plurality of coil connection electrodes 151 to which ends of coils to be described later are connected, a plurality of power supply electrodes 153, and wires 152 for connecting the respective coil connection electrodes 151 with the respective power supply electrodes 153 are formed on the substrate 15. Wires (not shown) extending from an upper driving device (not shown) are connected to the plurality of power supply electrodes 153. Therefore, an opening 110 is formed in the cover 11 to expose the plurality of power supply electrodes 153.

As shown in FIGS. 3, 4 and 5, the actuator 1 includes a support 2, a movable body 3, and an elastic member 4 disposed between the movable body 3 and the support 2, and the movable body 3 is supported by the support 2 through the elastic member 4 to be movable in the Z direction (the first direction), the X direction (the second direction) and the Y direction. Further, the actuator 1 has a plurality of magnetic drive circuits (first magnetic drive circuit 6, second magnetic drive circuit 7, and third magnetic drive circuit 8) for driving and vibrating the movable body 3 in the X direction and the Y direction with respect to the support 2.

The support 2 has a first end plate 28 at an end on one side Z1 in the Z direction and a second end plate 29 at an end on the other side Z2 in the Z direction. The first end plate 28 is opposed to the movable body 3 on the one side Z1 in the Z direction, and a first elastic member 41 (elastic member 4) is disposed between the movable body 3 and the first end plate 28. The second end plate 29 is opposed to the movable body 3 on the other side Z2 in the Z direction, and a second elastic member 42 (the elastic member 4) is disposed between the movable body 3 and the second end plate 29.

The elastic member 4 is a viscoelastic body having viscoelasticity, and, in the present embodiment, a plate-like gel damper member is used as the elastic member 4 (the viscoelastic body). Both surfaces of the first elastic member 41 in the Z direction are respectively connected to the movable body 3 and the first end plate 28 by a method such as adhesion. Both surfaces of the second elastic member 42 in the Z direction are respectively connected to the movable body 3 and the second end plate 29 by a method such as adhesion. That is, the elastic member 4 is provided on the one side Z1 in the first direction Z with respect to the movable body 3 and on the other side Z2 in the first direction Z with respect to the movable body 3. Also, the elastic member 4 is disposed as a first elastic member 41 in contact with both of the movable body 3 and a portion of the support 2 (the first end plate 28) opposite to the movable body 3 on the one side Z1 in the first direction Z, and as a second elastic member 42 in contact with both of the movable body 3 and a portion of the support 2 (the second end plate 29) opposite to the movable body 3 on the other side Z2 in the first direction Z.

The gel damper member has linear or non-linear expansion and contraction characteristics depending on the expansion and contraction direction thereof. For example, when the plate-like gel damper member is pressed in the thickness direction (axial direction) to be compressively deformed, the plate-like gel damper member has an expansion and contraction characteristic in which the non-linear component is larger than the linear component. On the other hand, when the plate-like gel damper member is pulled and stretched in the thickness direction (axial direction), the plate-like gel damper member has an expansion and contraction characteristic in which the linear component is larger than the non-linear component. Also, when the plate-like gel damper member is deformed in a direction (shear direction) intersecting with the thickness direction (axial direction), the plate-like gel damper member has a deformation characteristic in which the linear component is larger than the non-linear component. In the present embodiment, the elastic member 4 (the viscoelastic body) is configured to deform in the shearing direction when the movable body 3 is vibrated in the X direction and the Y direction.

The plurality of magnetic drive circuits (the first magnetic drive circuit 6, the second magnetic drive circuit 7, and the third magnetic drive circuit 8) each has coils and magnets facing the respective coils. The coils are provided on one of the support 2 and the movable body 3, and the magnets are provided on the other of the support 2 and the movable body 3. In the present embodiment, the coils (first coil 61, second coil 71 and third coil 81) and coil holders (first coil holder 65, second coil holder 75 and third coil holder 85) are provided on the support 2, as will be described below. Also, the magnets (first magnets 621 and 622, second magnets 721 and 722 and third magnets 821 and 822), and yokes (first yoke 64, second yoke 74 and third yoke 84) are provided on the movable body 3. The first magnetic drive circuit 6 is arranged to overlap with the second magnetic drive circuit 7 on the one side Z1 in the Z direction, and the third magnetic drive circuit 8 is arranged to overlap with the second magnetic drive circuit 7 on the opposite side to the first magnetic drive circuit 6 with respect to the second magnetic drive circuit 7. Therefore, the first magnetic drive circuit 6, the second magnetic drive circuit 7, and the third magnetic drive circuit 8 are arranged to be sequentially stacked from the one side Z1 to the other side Z2 in the Z direction.

Configuration of Drive Circuit

Figure 6:
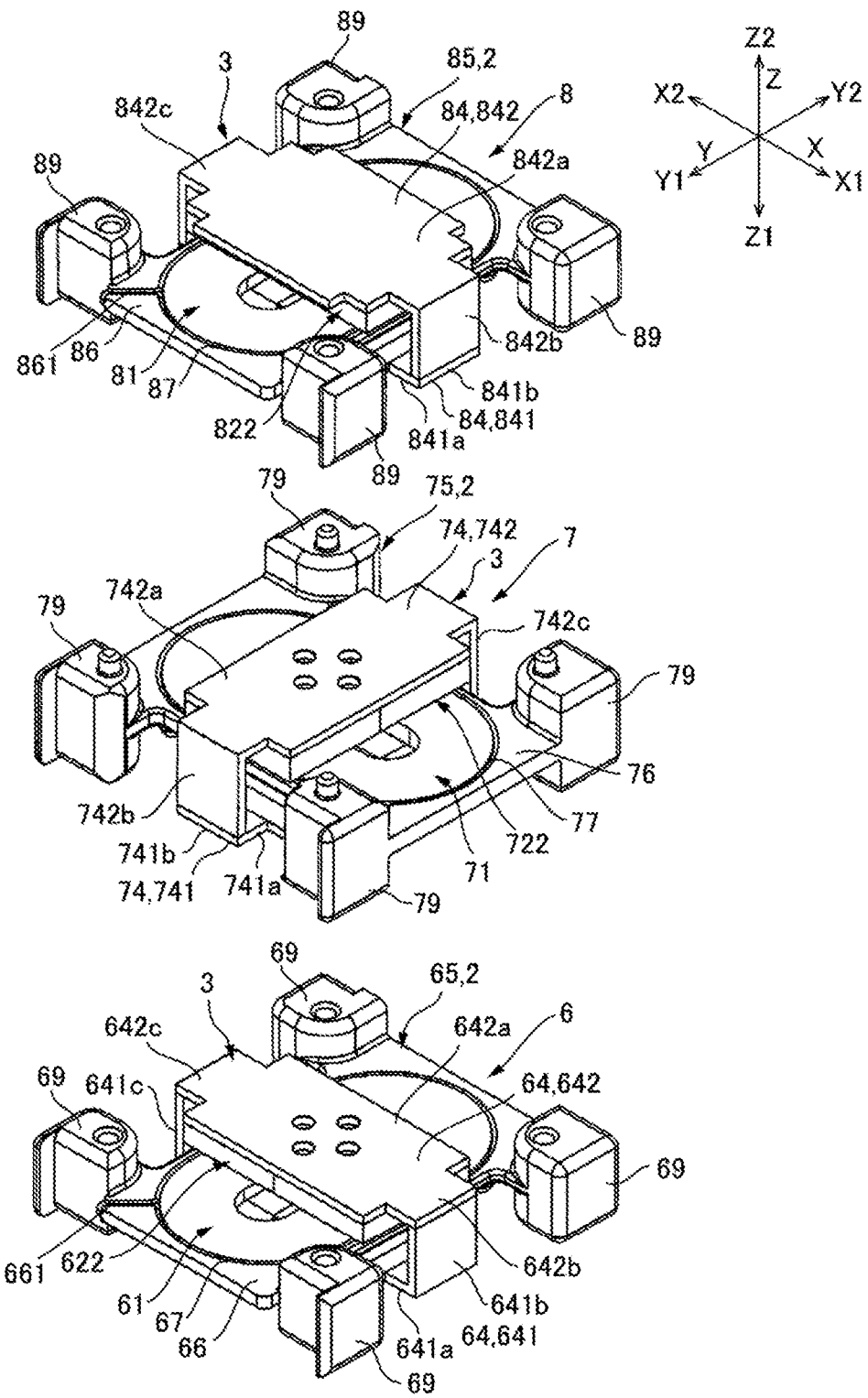
FIG. 6 is an exploded perspective view when a magnetic drive circuit used in the actuator shown in FIG. 1 is disassembled.

FIG. 6 is an exploded perspective view when a magnetic drive circuit used in the actuator shown in FIG. 1 is disassembled. As shown in FIGS. 3, 4, 5 and 6, the first magnetic drive circuit 6 includes the first coil 61, the first magnet 621 opposed to the first coil 61 on the one side Z1 in the Z direction, and the first magnet 622 opposed to the first coil 61 on the other side Z2 in the Z direction. The second magnetic drive circuit 7 includes the second coil 71, the second magnet 721 opposed to the second coil 71 on the one side Z1 in the Z direction, and the second magnet 722 opposed to the second coil 71 on the other side Z2 in the Z direction. The third magnetic drive circuit 8 includes the third coil 81, the third magnet 821 opposed to the third coil 81 on the one side Z1 in the Z direction, and the third magnet 822 opposed to the third coil 81 on the other side Z2 in the Z direction.

In order to arrange the first magnetic drive circuit 6, the second magnetic drive circuit 7, and the third magnetic drive circuit 8 configured as described above so as to be stacked on one another in the Z direction, the support 2 includes the first coil holder 65 for holding the first coil 61, the second coil holder 75 for holding the second coil 71, and the third coil holder 85 for holding the third coil 81. The first coil holder 65, the second coil holder 75 and the third coil holder 85 are arranged to be stacked sequentially from the one side Z1 to the other side Z2 in the Z direction. Further, among the first coil holder 65, the second coil holder 75, and the third coil holder 85, adjacent coil holders in the Z direction are coupled to each other.

Also, the movable body 3 includes a plurality of yokes (first yoke 64, second yoke 74 and third yoke 84) which are placed on the one side Z1 in the Z direction with respect to the first coil 61, between the first coil 61 and the second coil 71, between the second coil 71 and the third coil 81, and on the other side Z2 in the Z direction with respect to the third coil 81. The first magnets 621 and 622, the second magnets 721 and 722, and the third magnets 821 and 822 are each held in any one of the plurality of yokes. Further, among the plurality of yokes, adjacent yokes in the Z direction are coupled to each other.

In the present embodiment, the plurality of yokes includes the first yoke 64 disposed on both sides in the Z direction with respect to the first coil 61, the second yoke 74 disposed on both sides in the Z direction with respect to the second coil 71, and the third yoke 84 disposed on both sides in the Z direction with respect to the third coil 81. The first yoke 64 holds the first magnets 621 and 622 disposed on both sides in the Z direction with respect to the first coil 61. The second yoke 74 holds the second magnets 721 and 722 disposed on both sides in the Z direction with respect to the second coil 71. The third yoke 84 holds the third magnets 821 and 822 disposed on both sides in the Z direction with respect to the third coil 81.

Detailed Configuration of First Magnetic Drive Circuit 6

Figure 7:
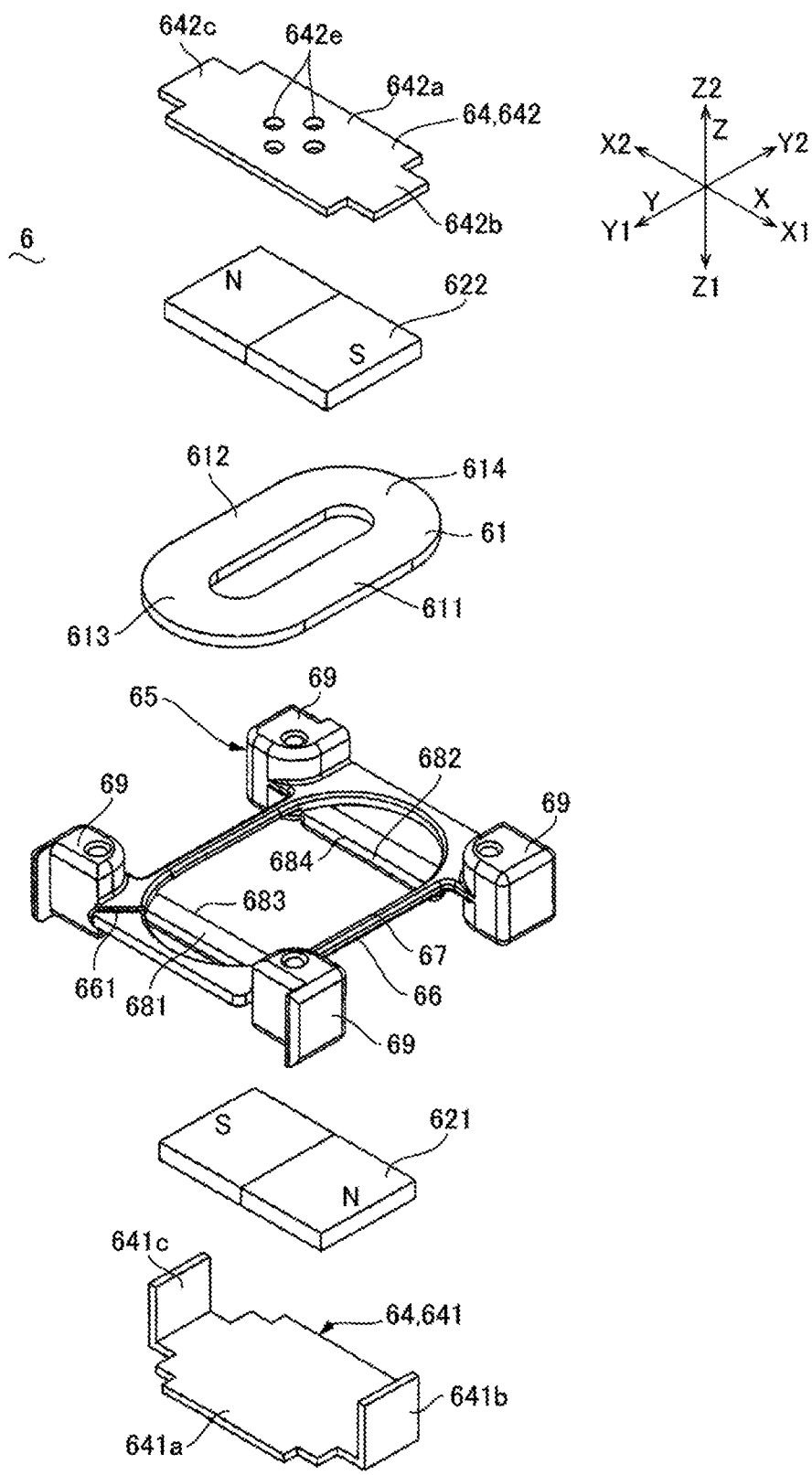
FIG. 7 is an exploded perspective view of a first magnetic drive circuit shown in FIG. 6.

FIG. 7 is an exploded perspective view of the first magnetic drive circuit 6 shown in FIG. 6. As shown in FIGS. 5, 6 and 7, the first coil holder 65 includes a first frame portion 66 which holds the first coil 61 on the inside thereof, and a plurality of first columnar portions 69 projecting from ends (four corners) of the first frame portion 66 to both sides in the Z direction. The first columnar portion 69 is coupled to the first end plate 28. The first coil holder 65 is made of resin or metal. In the present embodiment, the first coil holder 65 and the first end plate 28 are made of resin.

The first coil 61 used in the first magnetic drive circuit 6 is an oval air-core coil having first effective side portions 611 and 612 (long side portions) extending in the Y direction. In correspondence to the shape, the first frame portion 66 of the first coil holder 65 includes a first opening 67 which has an oval shape and the major axis direction of which is directed in the Y direction, and the first coil 61 is fixed to the inside of the first opening 67 by adhesion or the like.

In the first coil holder 65, at a position overlapping with both ends in the Y direction of the first opening 67 on the one side Z1 in the Z direction with respect to the first frame portion 66, first seat portions 681 and 682 that support, on the one side Z1 in the Z direction, first invalid side portions 613 and 614 (short side portions) extending in the X direction at both ends of the first coil 61 are provided. The first seat portions 681 and 682 project from the first frame portion 66 to the one side Z1 in the Z direction, and constitute a bottom portion of the one side Z1 in the Z direction at both ends in the Y direction of the first opening 67. A groove 661 extends from the first opening 67 toward the other side X2 in the X direction and the one side Y1 in the Y direction on the surface of the first frame portion 66 on the other side Z2 in the Z direction, and the groove 661 is a guide groove for passing the lead-out portion of the winding start of the first coil 61. The thickness (dimension in the Z direction) of the first frame portion 66 is larger than the thickness (dimension in the Z direction) of the first coil 61. Therefore, in a state where the first coil 61 is accommodated inside the first opening 67, the first coil 61 does not project from the first frame portion 66 to the other side Z2 in the Z direction.

Each of the first magnets 621 and 622 has a rectangular planar shape, and has long sides extending in the X direction and short sides extending in the Y direction. The first magnets 621 and 622 are each magnetized in the X direction, and the N poles and the S poles are respectively opposed to the first effective side portions 611 and 612 of the first coil 61. Therefore, when the first coil 61 is energized, the first magnetic drive circuit 6 generates a driving force for driving the movable body 3 in the X direction. In the first magnetic drive circuit 6, the first yoke 64 includes a yoke plate 641 disposed on the one side Z1 in the Z direction with respect to the first coil 61, and a yoke plate 642 disposed on the other side Z2 in the Z direction with respect to the first coil 61. The yoke plate 641 includes a magnet holding portion 641*a* having a flat shape and holding the first magnet 621 with the surface thereof on the other side Z2 in the Z direction, and side plate portions 641*b* and 641*c* which are bent toward the other side Z2 in the Z direction from both ends of the magnet holding portion 641*a* in the X direction. The yoke plate 642 includes a magnet holding portion 642*a* having a flat shape and holding the first magnet 622 with the surface thereof on the one side Z1 in the Z direction, and coupling plate portions 642*b* and 642*c* projecting from both ends of the magnet holding portion 642*a* in the X direction to one side X1 and the other side X2 in the X direction. In the present embodiment, the end of the side plate portion 641*b* of the yoke plate 641 and the end of the coupling plate portion 642*b* of the yoke plate 642 are coupled by welding, crimping, or the like, and the end of the side plate portion 641*c* of the yoke plate 641 and the end of the coupling plate portion 642*c* of the yoke plate 642 are coupled by welding, crimping, or the like.

Detailed Configuration of Second Magnetic Drive Circuit 7

Figure 8:
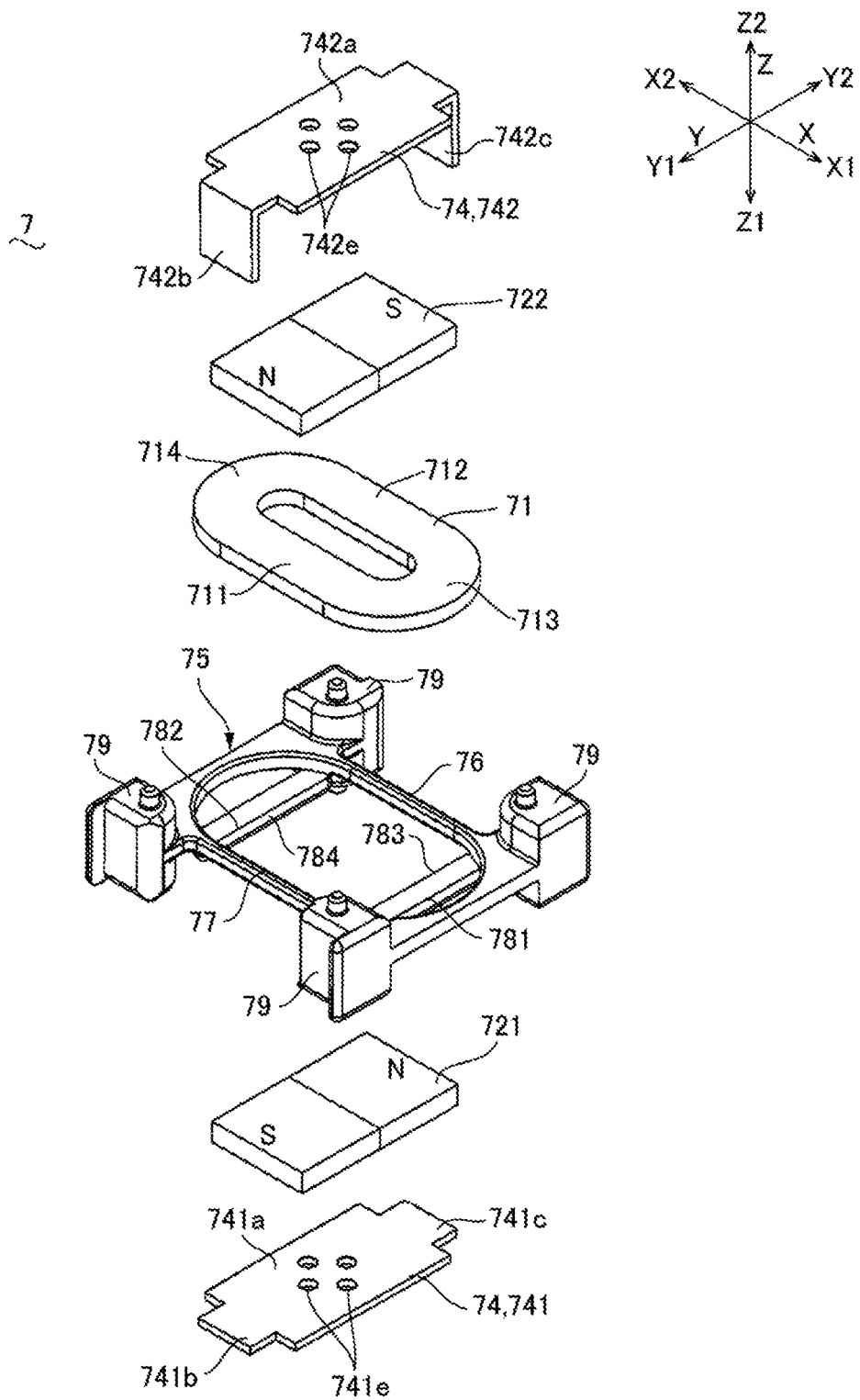
FIG. 8 is an exploded perspective view of a second magnetic drive circuit shown in FIG. 6.

FIG. 8 is an exploded perspective view of the second magnetic drive circuit 7 shown in FIG. 6. As shown in FIGS. 5, 6 and 8, the second coil holder 75 includes a second frame portion 76 which holds the second coil 71 on the inside thereof, and a plurality of second columnar portions 79 projecting from ends (four corners) of the second frame portion 76 to both sides in the Z direction, and the second columnar portions 79 are coupled to the first columnar portion 69 of the first coil holder 65 adjacent on the one side Z1 in the Z direction. The second coil holder 75 is made of resin or metal. In the present embodiment, the second coil holder 75 is made of resin.

The second coil 71 used in the second magnetic drive circuit 7 is an oval air-core coil having second effective side portions 711 and 712 (long side portions) extending in the X direction. In corresponding to the shape, the second frame portion 76 of the second coil holder 75 includes a second opening 77 which has an oval shape and the major axis direction of which is directed in the X direction and the second coil 71 is fixed to the inside of the second opening 77 by adhesion or the like.

In the second coil holder 75, at a position overlapping with both ends of the second opening 77 in the X direction, on the one side Z1 in the Z direction with respect to the second frame portion 76, second seat portions 781 and 782 that support, on the one side Z1 in the Z direction, second invalid side portions 713 and 714 (short side portions) extending in the Y direction at both ends of the second coil 71 are provided. The second seat portions 781 and 782 project from the second frame portion 76 to the one side Z1 in the Z direction, and constitute a bottom portion of the one side Z1 in the Z direction at both ends of the second opening 77 in the X direction. A groove (not shown) extends from the second opening 77 toward the one side X1 in the X direction and the one side Y1 in the Y direction on the surface of the second frame portion 76 on the other side Z2 in the Z direction, and the groove is a guide groove for passing the lead-out portion of the winding start of the second coil 71. The thickness (dimension in the Z direction) of the second frame portion 76 is larger than the thickness (dimension in the Z direction) of the second coil 71. Therefore, in a state where the second coil 71 is accommodated inside the second opening 77, the second coil 71 does not project from the second frame portion 76 to the other side Z2 in the Z direction.

Each of the second magnets 721 and 722 has a rectangular planar shape, and has long sides extending in the Y direction and short sides extending in the X direction. The second magnets 721 and 722 are each polarized in the Y direction, and the N poles and the S poles are respectively opposed to the second effective side portions 711 and 712 of the second coil 71. Therefore, when the second coil 71 is energized, the second magnetic drive circuit 7 generates a driving force for driving the movable body 3 in the Y direction. In the second magnetic drive circuit 7, the second yoke 74 includes a yoke plate 741 disposed on the one side Z1 in the Z direction with respect to the second coil 71, and a yoke plate 742 disposed on the other side Z2 in the Z direction with respect to the second coil 71. The yoke plate 742 includes a magnet holding portion 742*a* having a flat shape and holding the second magnet 722 with the surface thereof on the one side Z1 in the Z direction, and side plate portions 742b and 742c which are bent toward the one side Z1 in the Z direction from both ends of the magnet holding portion 742a in the Y direction. The yoke plate 741 includes a magnet holding portion 741a having a flat shape and holding the second magnet 721 with the surface thereof on the other side Z2 in the Z direction, and coupling plate portions 741b and 741c projecting from both ends of the magnet holding portion 741a in the Y direction to the one side Y1 and the other side Y2 in the Y direction. In the present embodiment, the end of the side plate portion 742b of the yoke plate 742 and the end of the coupling plate portion 741b of the yoke plate 741 are coupled by welding, crimping, or the like, and the end of the side plate portion 742c of the yoke plate 742 and the end of the coupling plate portion 741c of the yoke plate 741 are coupled by welding, crimping, or the like.

The yoke plate 741 and the yoke plate 642 have holes 741e and 642e, respectively, and the yoke plate 741 and the yoke plate 642 are coupled by welding, crimping or the like inside the holes 741e and 642e after being positioned with reference to the holes 741e and 642e.

Detailed Configuration of Third Magnetic Drive Circuit 8

Figure 9:
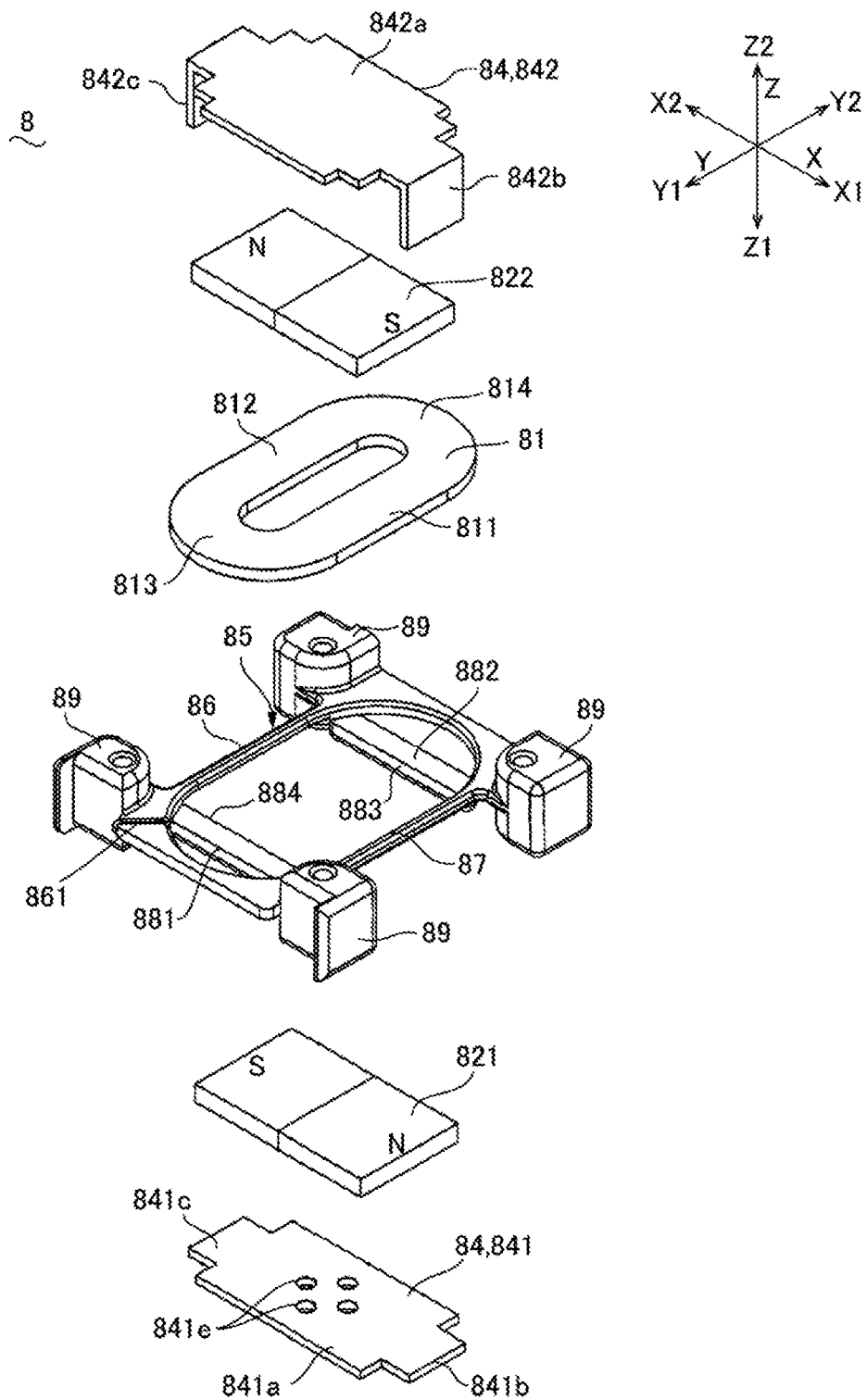
FIG. 9 is an exploded perspective view of a third magnetic drive circuit shown in FIG. 6.

FIG. 9 is an exploded perspective view of the third magnetic drive circuit 8 shown in FIG. 6. As shown in FIGS. 5, 6 and 9, the third coil holder 85 includes a third frame portion 86 which holds the third coil 81 on the inside thereof and a plurality of third columnar portions 89 projecting from ends (four corners) of the third frame portion 86 to both sides in the Z direction, and the third columnar portion 89 is coupled to the second columnar portion 79 of the second coil holder 75 adjacent on the one side Z1 in the Z direction. In addition, the third columnar portion 89 is coupled to the second end plate 29. The third coil holder 85 is made of resin or metal. In the present embodiment, the third coil holder 85 and the second end plate 29 are made of resin.

The third magnetic drive circuit 8 is configured similarly to the first magnetic drive circuit 6. More specifically, the third coil 81 used in the third magnetic drive circuit 8 is an oval air-core coil having third effective side portions 811 and 812 (long side portions) extending in the Y direction. In corresponding to the shape, the third frame portion 86 of the third coil holder 85 includes a third opening 87 which has an oval shape and the major axis direction of which is directed in the X direction, and the third coil 81 is fixed to the inside of the third opening 87 by adhesion or the like.

In the third coil holder 85, at a position overlapping with both ends of the third opening 87 in the Y direction on the one side Z1 in the Z direction with respect to the third frame portion 86, third seat portions 881 and 882 that support, on the one side Z1 of the Z direction, third invalid side portions 813 and 814 (short side portions) extending in the X direction at both ends of the third coil 81 are provided. The third seat portions 881 and 882 project from the third frame portion 86 to the one side Z1 in the Z direction, and constitute a bottom portion of the one side Z1 in the Z direction at both ends of the third opening 87 in the Y direction. A groove 861 extends from the third opening 87 toward the other side X2 in the X direction and the one side Y1 in the Y direction on the surface of the third frame portion 86 on the other side Z2 in the Z direction, and the groove 861 is a guide groove for passing the lead-out portion of the winding start and the lead-out portion of the winding end of the third coil 81. The thickness (dimension in the Z direction) of the third frame portion 86 is larger than the thickness (dimension in the Z direction) of the third coil 81. Therefore, in a state where the third coil 81 is accommodated inside the third opening 87, the third coil 81 does not project from the third frame portion 86 to the other side Z2 in the Z direction.

Each of the third magnets 821 and 822 has a rectangular planar shape, and has long sides extending in the X direction and short sides extending in the Y direction. The third magnets 821 and 822 are each magnetized in the X direction, and the N poles and the S poles are opposed to the third effective side portions 811 and 812 of the third coil 81, respectively. Therefore, when the third coil 81 is energized, the third magnetic drive circuit 8 generates a driving force for driving the movable body 3 in the X direction in the same manner as the first magnetic drive circuit 6. In the present embodiment, the third magnet 821 is magnetized in the same direction as the first magnet 621 of the first magnetic drive circuit 6, and the third magnet 822 is magnetized in the same direction as the first magnet 622 of the first magnetic drive circuit 6.

In the third magnetic drive circuit 8, the third yoke 84 includes a yoke plate 841 disposed on the one side Z1 in the Z direction with respect to the third coil 81, and a yoke plate 842 disposed on the other side Z2 in the Z direction with respect to the third coil 81. The yoke plate 842 includes a magnet holding portion 842a having a flat shape and holding the third magnet 821 with the surface thereof on the one side Z1 in the Z direction, and side plate portions 842b and 842c which are bent toward the one side Z1 in the Z direction from both ends of the magnet holding portion 842a in the X direction. The yoke plate 841 includes a magnet holding portion 841a having a flat shape and holding the third magnet 822 with the surface thereof on the one side Z1 in the Z direction, and coupling plate portions 841b and 841c projecting from both ends of the magnet holding portion 841a in the X direction to the one side X1 and the other side X2 in the X direction. In the present embodiment, the end of the side plate portion 842b of the yoke plate 842 and the end of the coupling plate portion 841b of the yoke plate 841 are coupled by welding, crimping, or the like, and the end of the side plate portion 842c of the yoke plate 842 and the end of the coupling plate portion 841c of the yoke plate 841 are coupled by welding, crimping, or the like. The yoke plate 841 and the yoke plate 742 have holes 841e and 742e, respectively, and the yoke plate 841 and the yoke plate 742 are coupled by welding, crimping or the like inside the holes 841e and 742e after being positioned with reference to the holes 841e and 742e.

(Positional Relationship Between Magnetic Center Of Magnetic Drive Circuit And Center Of Gravity Of Movable Body 3)

In the actuator 1 configured as described above, the first coil 61, the second coil 71, the third coil 81, the first coil holder 65, the second coil holder 75, and the third coil holder 85 are configured to be symmetrical with respect to a virtual line extending in the Y direction through the center of the movable body 3 in the X direction, and with respect to a virtual line extending in the X direction through the center of the movable body 3 in the Y direction. Also, the first magnets 621 and 622, the second magnets 721 and 722, the third magnets 821 and 822, the first yoke 64, the second yoke 74, and the third yoke 84 are configured to be symmetrical with respect to a virtual line extending in the Y direction through the center of the movable body 3 in the X direction, and with respect to a virtual line extending in the X direction through the center of the movable body 3 in the Y direction. Further, the second coil 71 is located at the center of the movable body 3 in the Z direction, and the second magnets 721 and 722 are disposed plane-symmetrically about the second coil 71 in the Z direction. Moreover, the first magnets 621 and 622 and the first yoke 64 are arranged plane-symmetrically about the second coil 71 in the Z direction with respect to the third magnets 821 and 822 and the third yoke 84.

Therefore, the magnetic center position (drive center) of the second magnetic drive circuit 7 coincides with or substantially coincides with the position of the center of gravity of the movable body 3 in the Z, X, and Y directions. Also, the magnetic center position obtained by combining the magnetic center position of the first magnetic drive circuit 6 and the magnetic center position of the third magnetic drive circuit 8 coincides with or substantially coincides with the position of the center of gravity of the movable body 3 in the Z, X and Y directions.

Configuration of Substrate 15

As shown in FIG. 2, the substrate 15 is provided with, as a plurality of coil connection electrodes 151, first coil connection electrodes 151a and 151b to which the ends (not shown) of the lead-out portions of the winding start and the winding end of the first coil 61 are respectively connected, second coil connection electrodes 151c and 151d to which the ends (not shown) of the lead-out portions of the winding start and the winding end of the second coil 71 are respectively connected, and third coil connection electrodes 151e and 151f to which the ends (not shown) of the lead-out portions of the winding start and the winding end of the third coil 81 are respectively connected. The substrate 15 is also provided with, as a plurality of power supply electrodes 153, a first power supply electrode 153a, a second power supply electrode 153b, a third power supply electrode 153c, a fourth power supply electrode 153d, a fifth power supply electrode 153e, and a sixth power supply electrode 153f.

The first power supply electrode 153a is electrically connected to the first coil connection electrode 151a through a wire 152a among the plurality of wires 152, and the second power supply electrode 153b is electrically connected to the first coil connection electrode 151b through a wire 152b among the plurality of wires 152. Therefore, the first power supply electrode 153a is electrically connected to one end of the second coil 71 (end of the lead-out portion of the winding start), and the second power supply electrode 153b is electrically connected to the other end of the second coil 71 (end of the lead-out portion of the winding end).

The third power supply electrode 153c is electrically connected to the second coil connection electrode 151c through a wire 152c among the plurality of wires 152, and the fourth power supply electrode 153d is electrically connected to the second coil connection electrode 151d through a wire 152d among the plurality of wires 152. Therefore, the third power supply electrode 153c is electrically connected to one end of the second coil 71 (end of the lead-out portion of the winding start), and the fourth power supply electrode 153d is electrically connected to the other end of the second coil 71 (end of the lead-out portion of the winding end).

The fifth power supply electrode 153e is electrically connected to the third coil connection electrode 151e through a wire 152e among the plurality of wires 152, and the sixth power supply electrode 153f is electrically connected to the third coil connection electrode 151f through a wire 152f among the plurality of wires 152. Therefore, the fifth power supply electrode 153e is electrically connected to one end of the third coil 81 (end of the lead-out portion of the winding start), and the sixth power supply electrode 153f is electrically connected to the other end of the third coil 81 (end of the lead-out portion of the winding end).

Also, as shown in FIG. 1, a wiring board 16 such as a flexible wiring board is connected to the substrate 15, and the wiring board 16 is provided with a plurality of wires (not shown) independently connected to the first power supply electrode 153a, the second power supply electrode 153b, the third power supply electrode 153c, the fourth power supply electrode 153d, the fifth power supply electrode 153e, and the sixth power supply electrode 153f. Therefore, a drive signal is supplied to the actuator 1 from the upper driving device through the wiring board 16.

Basic Operation

In the actuator 1 of the present embodiment, when the power supply to the second coil 71 is stopped while an alternating current (AC) of the same waveform is applied to the first coil 61 and the third coil 81 through the first power supply electrode 153a, the second power supply electrode 153b, the fifth power supply electrode 153e, and the sixth power supply electrode 153f, the movable body 3 vibrates in the X direction, and the center of gravity in the actuator 1 fluctuates in the X direction. Therefore, the user can feel the vibration in the X direction. At this time, if the AC waveform of the first coil drive signal applied to the first coil 61 and the AC waveform of the third coil drive signal applied to the third coil 81 are adjusted such that the acceleration at which the movable body 3 moves to the one side X1 in the X direction is different from the acceleration at which the movable body 3 moves to the other side X2 in the X direction, the user can feel vibration having directivity in the X direction.

Further, the power supply to the first coil 61 and the third coil 81 is stopped while AC is applied to the second coil 71 through the third power supply electrode 153c and fourth power supply electrode 153d. As a result, the movable body 3 vibrates in the Y direction, and the center of gravity in the actuator 1 fluctuates in the Y direction. Therefore, the user can feel the vibration in the Y direction. At this time, the AC waveform of the second coil drive signal applied to the second coil 71 is adjusted such that the acceleration at which the movable body 3 moves to the one side Y1 in the Y direction is different from the acceleration at which the movable body 3 moves to the other side Y2 in the third direction. As a result, the user can feel vibration having directivity in the Y direction.

Further, by combining the energization of the first coil 61 and the third coil 81 and the energization of the second coil 71, the user can obtain a sensation in which the vibration in the X direction and the vibration in the Y direction are combined.

Here, the different power supply electrodes 153 (the first power supply electrode 153a, the second power supply electrode 153b, the fifth power supply electrode 153e and the sixth power supply electrode 153f) are electrically connected to the end of the first coil 61 and the end of the third coil 81, respectively. Therefore, alternating currents having different waveforms can be applied to the first coil 61 and the third coil 81. Accordingly, the movable body 3 can perform a combination of vibrations corresponding to the waveforms applied to the first coil 61 and the third coil 81. For example, when alternating currents having waveforms of opposite phases are applied to the first coil 61 and the third coil 81, couple of forces around the central axis extending in the Z direction is added to the movable body 3. As a result, the user can further feel vibration around the central axis extending in the Z direction of the movable body 3.

Stopper Mechanism

The actuator 1 of the present embodiment has a stopper mechanism shown in FIGS. 3 and 4 such that, when the movable body 3 moves excessively with respect to the support 2, a weak portion of one of the support 2 and the movable body 3 is prevented from coming into contact with the other. More specifically, as shown in FIG. 4, the first seat portion 681 of the first coil holder 65 is located at a position facing the first magnet 621 with a predetermined distance on the one side Y1 in the Y direction, and the first seat portion 682 of the first coil holder 65 is located at a position facing the first magnet 621 with a predetermined distance on the other side Y2 in the Y direction. Further, the third seat portion 881 of the third coil holder 85 is located at a position facing the third magnet 821 with a predetermined distance on the one side Y1 in the Y direction, and the third seat portion 882 of the third coil holder 85 is located at a position facing the third magnet 821 with a predetermined distance on the other side Y2 in the Y direction. In the present embodiment, the side end portions of the first seat portions 681 and 682 opposite to the first magnet 621 in the Y direction function as first stopper portions 683 and 684. Further, the side end portions of the third seat portions 881 and 882 opposite to the third magnet 821 in the Y direction function as third stopper portions 883 and 884. Therefore, the movable range of the movable body 3 in the Y direction when the movable body 3 is driven in the Y direction by the second magnetic drive circuit 7 is regulated by a stopper mechanism constituted by the first magnet 621 of the first magnetic drive circuit 6 and the first seat portions 681 and 682 (the first stoppers 683 and 684) of the first coil holder 65, and a stopper mechanism constituted by the third magnet 821 of the third magnetic drive circuit 8 and the third seat portions 881 and 882 (the third stoppers 883 and 884) of the third coil holder 85.

In the present embodiment, the first stopper portions 683 and 684 are positioned closer to the side of the first magnets 621 than the inner edges of the first invalid side portions 613 and 614 of the first coil 61. Therefore, even if, for example, the lead-out portion on the winding start side of the first coil 61 passes between the first coil 61 and the first seat portion 681 from the inner edge of the first invalid side portion 613, it is unlikely that the first magnet 621 will come into contact with the lead-out portion on the winding start side of the first coil 61. Therefore, it is unlikely that the lead-out portion on the winding start side of the first coil 61 will be disconnected. The third stopper portions 883 and 884 are located closer to the side of the third magnet 821 than the inner edges of the third invalid side portions 813 and 814 of the third coil 81. Therefore, even if, for example, the lead-out portion on the winding start side of the third coil 81 passes between the third coil 81 and the third seat portion 881 from the inner edge of the third invalid side portion 813, it is unlikely that the third magnet 821 will come into contact with the lead-out portion on the winding start side of the third coil 81. Therefore, it is unlikely that the lead-out portion on the winding start side of the third coil 81 will be disconnected.

Further, as shown in FIG. 3, the second seat portion 781 of the second coil holder 75 is located at a position opposite to the second magnet 721 of the second magnetic drive circuit 7 with a predetermined distance on the one side X1 in the X direction, and the second seat portion 782 of the second coil holder 75 is located at a position opposite to the second magnet 721 with a predetermined distance on the other side X2 in the X direction. In the present embodiment, the side end portions of the second seat portions 781 and the second seat portion 782 opposite to the second magnet 721 in the X direction functions as the second stopper portions 783 and 784. Therefore, the movable range when the movable body 3 is driven in the X direction by the first magnetic drive circuit 6 and the third magnetic drive circuit 8 is regulated by a stopper mechanism constituted by the second magnet 721 of the second magnetic drive circuit 7 and the second seat portions 781 and 782 (the second stoppers 783 and 784) of the second coil holder 75.

In the present embodiment, the second stopper portions 783 and 784 are positioned closer to the side of the second magnets 721 than the inner edges of the second invalid side portions 713 and 714 of the second coil 71. Therefore, even if, for example, the lead-out portion on the winding start side of the second coil 71 passes between the second coil 71 and the second seat portion 781 from the inner edge of the second invalid side portion 713, it is unlikely that the second magnet 721 will come into contact with the lead-out portion on the winding start side of the second coil 71. Therefore, it is unlikely that the lead-out portion on the winding start side of the second coil 71 will be disconnected.

Main Effect of the Present Embodiment

As described above, the actuator 1 according to the present embodiment has the first magnetic drive circuit 6 vibrating the movable body 3 in the X direction (the second direction), the second magnetic drive circuit 7 vibrating the movable body 3 in the Y direction (the third direction), and the third magnetic drive circuit 8 vibrating the movable body 3 in the X direction, and thus the movable body 3 can be vibrated in the X direction and the Y direction. Therefore, the user can feel vibration in the X direction, vibration in the Y direction, and vibration in which the vibration in the X direction and the vibration in the Y direction are combined. Moreover, since the first magnetic drive circuit 6, the second magnetic drive circuit 7, and the third magnetic drive circuit 8 are arranged to be stacked in the Z direction, the size (planar area) of the actuator 1 when viewed from the Z direction is small. Therefore, the actuator 1 according to the present embodiment is suitable for mounting on a device such as a controller or the like held in hand. Further, the first magnetic drive circuit 6 and the third magnetic drive circuit 8 for vibrating the movable body 3 in the X direction are provided on both sides in the Z direction of the second magnetic drive circuit 7 for vibrating the movable body 3 in the Y direction. Therefore, when the movable body 3 is vibrated in the X direction, a situation such as tilting of the movable body 3 hardly occurs.

Also, the magnetic center position (drive point) of the second magnetic drive circuit 7 coincides with or substantially coincides with the position of the center of gravity of the movable body 3 in the Z, X and Y directions. Also, the magnetic center position obtained by combining the magnetic center position (drive point) of the first magnetic drive circuit 6 and the magnetic center position (drive point) of the third magnetic drive circuit 8 coincides or substantially coincides with the position of the center of gravity of the movable body 3 in the Z, X, and Y directions. Therefore, when the movable body 3 is vibrated in the X direction and the Y direction, a situation such as tilting of the movable body 3 hardly occurs.

The substrate 15 held in the support 2 is provided with the first power supply electrode 153*a* electrically connected to one end of the first coil 61, the second power supply electrode 153*b* electrically connected to the other end of the first coil 61, the third power supply electrode 153*c* electrically connected to one end of the second coil 71, the fourth power supply electrode 153*d* electrically connected to the other end of the second coil 71, the fifth power supply electrode 153*e* electrically connected to one end of the third coil 81, and the sixth power supply electrode 153*f* electrically connected to the other end of the third coil 81. Therefore, when the drive signal is supplied to the first coil 61 through the first power supply electrode 153*a* and the second power supply electrode 153*b*, the drive signal having the same waveform as that of the drive vibration supplied to first coil 61 can be supplied to the third coil 81. Further, when supplying the drive signal to the first coil 61 through the first power supply electrode 153*a* and the second power supply electrode 153*b*, an arbitrary drive signal different in waveform from the drive vibration supplied to the first coil 61 can be supplied to the third coil 81 through the fifth power supply electrode 153*e* and the sixth power supply electrode 153*f*. Therefore, a complex drive combining the drive based on the drive signal supplied to the first coil 61 and the drive based on the drive signal supplied to the third coil 81 can easily be performed on the movable body 3.

Further, in the present embodiment, the cover 11 has an opening 110 that exposes the first power supply electrode 153*a*, the second power supply electrode 153*b*, the third power supply electrode 153*c*, the fourth power supply electrode 153*d*, the fifth power supply electrode 153*e*, and the sixth power supply electrode 153*f*. Therefore, even when the cover 11 is provided, independent wires can be connected to each of the first power supply electrode 153*a*, the second power supply electrode 153*b*, the third power supply electrode 153*c*, the fourth power supply electrode 153*d*, the fifth power supply electrode 153*e*, and the sixth power supply electrode 153*f*. Therefore, a complex drive combining the drive based on the drive signal supplied to the first coil 61 and the drive based on the drive signal supplied to the third coil 81 can easily be performed on the movable body 3.

Also, the elastic member 4 is the viscoelastic member having viscoelasticity, and is provided on the one side Z1 in the Z direction with respect to the movable body 3 and on the other side Z2 in the Z direction with respect to the movable body 3. Therefore, when the movable body 3 vibrates in the X direction and the Y direction with respect to the support 2, the elastic member 4 deforms in the shearing direction orthogonal to the expansion and contraction direction. Therefore, since the elastic member 4 deforms in a range in which linearity is high, it is possible to obtain a vibration characteristic with good linearity.

That is, the elastic member 4 (the first elastic member 41 and the second elastic member 42) is the viscoelastic member (plate-like gel damper member), and has linear or non-linear expansion and contraction characteristics depending on the expansion and contraction direction. For example, when the elastic member 4 is pressed in the thickness direction (axial direction) to be compressed and deformed, the elastic member 4 has an expansion and contraction characteristic in which the non-linear component (spring coefficient) is larger than the linear component (spring coefficient). On the other hand, when the elastic member 4 is pulled and extended in the thickness direction (axial direction), the elastic member 4 has an expansion and contraction characteristic in which the linear component (spring coefficient) is larger than the non-linear component (spring coefficient). Further, when the elastic member 4 is deformed in a direction (shearing direction) intersecting the thickness direction (axial direction), the deformation is a deformation in a direction in which the elastic member 4 is pulled and extended whichever direction the elastic member 4 moves. Therefore, the elastic member 4 has a deformation characteristic in which the linear component (spring coefficient) is larger than the non-linear component (spring coefficient). In the present embodiment, the elastic member 4 (viscoelastic member) is configured to deform in the shearing direction when the movable body 3 vibrates in the X direction and the Y direction. Therefore, when the movable body 3 vibrates in the X direction and the Y direction, the spring force in the movement direction becomes constant in the elastic member 4. Therefore, by using the spring element of the elastic member 4 in the shearing direction to improve the reproducibility of the vibration acceleration for the input signal, it is possible to realize the vibration with delicate nuances.

Further, the elastic member 4 is attached so as to expand and contract in the first direction Z between the movable body 3 and the support 2. Furthermore, when the elastic member 4 is pressed in the thickness direction (axial direction) between the movable body 3 and the support 2 to be compressed and deformed, the elastic member 4 has an expansion and contraction characteristic in which the non-linear component (spring coefficient) is larger than the linear component (spring coefficient). Therefore, it is possible to suppress large deformation of the elastic member 4 in the Z direction orthogonal to the driving direction of the movable body 3. Therefore, a large change in the gap between the movable body 3 and the support 2 can be suppressed.

Also, both surfaces of the first elastic member 41 in the Z direction are respectively connected to the movable body 3 and the first end plate 28 by a method such as adhesion, and both surfaces of the second elastic member 42 in the Z direction are respectively connected to the movable body 3 and the second end plate 29 by a method such as adhesion. Therefore, since the elastic member 4 reliably follows the movement of the movable body 3, it is possible to effectively prevent the resonance of the movable body 3.

Other Embodiments

In the second embodiment, the first magnets 621 and 622 are disposed on both sides of the first coil 61 of the first magnetic drive circuit 6 in the Z direction, and the third magnets 821 and 822 are disposed on both sides of the third coil 81 of the third magnetic drive circuit 8 in the Z direction. However, the first magnet may be disposed on only one side of the first coil 61 of the first magnetic drive circuit 6 in the Z direction, and the third magnet may be disposed on only one side of the third coil 81 of the third magnetic drive circuit 8 in the Z direction.

In the above embodiment, the elastic members 4 (viscoelastic members) are disposed on both sides of the movable body 3 in the Z direction. However, the elastic members 4 (viscoelastic members) may be disposed on both sides of the movable body 3 in the X direction and on both sides of the movable body 3 in the Y direction. Further, in the above embodiment, the gel damper member is used as the elastic member 4. However, rubber or a spring may be used as the elastic member 4. As a gel member (gel damper member), a silicone-based gel can be shown as an example. More specifically, as the elastic member 4, a silicone-based gel having a penetration of 10 degrees to 110 degrees can be used. The penetration degree is defined in JIS-K-2207 and JIS-K-2220, and means that the smaller the value, the harder it is.

Viscoelasticity is a property of both viscosity and elasticity, and is a characteristic property of a polymer material such as a gel member, a plastic material, and a rubber material. Accordingly, as the elastic member 4 having viscoelasticity, various rubber materials such as natural rubber, diene rubber (for example, styrene-butadiene rubber, isoprene rubber, butadiene rubber, chloroprene rubber, acrylonitrile-butadiene rubber, or the like), non-diene rubber (for example, butyl rubber, ethylene propylene rubber, ethylene propylene diene rubber, urethane rubber, silicone rubber, fluorine rubber, or the like), and thermoplastic elastomer, and a modified material thereof may be used.

In the above embodiment, in connecting both surfaces of the first elastic member 41 in the Z direction with the movable body 3 and the first end plate 28 by adhesion, and connecting both surfaces of the second elastic member 42 in the Z direction with the movable body 3 and the second end plate 29 by adhesion, the elastic member 4 (the first elastic member 41 and the second elastic member 42) is in a state of being compressed in the Z direction between the support 2 and the movable body 3. Therefore, since the elastic member 4 reliably follows the movement of the movable body 3, the resonance of the movable body 3 can be effectively prevented.

In the above embodiment, the coils and the coil holders are provided on the support 2, and the magnets and the yokes are provided on the movable body 3. However, the present invention may be applied to the case where the coils and the coil holders are provided on the movable body 3, and the magnets and the yokes are provided on the support 2.

INDUSTRIAL APPLICABILITY

In the present invention, the substrate held on the support is provided with the first power supply electrode electrically connected to one end of the first coil, the second power supply electrode electrically connected to the other end of the first coil, the third power supply electrode electrically connected to one end of the second coil, the fourth power supply electrode electrically connected to the other end of the second coil, the fifth power supply electrode electrically connected to one end of the third coil, and the sixth power supply electrode electrically connected to the other end of the third coil. Therefore, when the drive signal is supplied to the first coil through the first electrode and the second electrode, the same drive signal as the drive vibration supplied to the first coil can be supplied to the third coil. Also, when supplying the drive signal to the first coil through the first electrode and the second electrode, an arbitrary drive signal different in waveform from the drive vibration supplied to the first coil can be supplied to the third coil through the fifth power supply electrode and the sixth power supply electrode. Therefore, a complex drive combining the drive based on the drive signal supplied to the first coil and the drive based on the drive signal supplied to the third coil can easily be performed on the movable body.

What is claimed is:
1. An actuator comprising:
   a support;
   a movable body movable with respect to the support;
   a first magnetic drive circuit that comprises a first coil and a first magnet facing each other in a first direction, and generates a driving force to drive the movable body in a second direction orthogonal to the first direction;
   a second magnetic drive circuit that comprises a second coil and a second magnet facing each other in the first direction, and generates a driving force to drive the movable body in a third direction orthogonal to the first direction;
   a third magnetic drive circuit comprising a third coil and a third magnet facing each other in the first direction at a position spaced apart from the first magnetic drive circuit, the third magnetic drive circuit generating a driving force to drive the movable body in the second direction, which is orthogonal to the first direction and crosses the third direction; and
   a substrate held by the support,
   wherein the substrate is provided with: a first power supply electrode electrically connected to one end of the first coil; a second power supply electrode electrically connected to the other end of the first coil; a third power supply electrode electrically connected to one end of the second coil; a fourth power supply electrode electrically connected to the other end of the second coil; a fifth power supply electrode electrically connected to one end of the third coil, and a sixth power supply electrode electrically connected to the other end of the third coil.

2. The actuator according to claim 1,
   wherein the support comprises a cover covering the movable body, the first magnetic drive circuit, the second magnetic drive circuit, and the third magnetic drive circuit, and
   wherein the cover comprises an opening which exposes the first power supply electrode, the second power supply electrode, the third power supply electrode, the fourth power supply electrode, the fifth power supply electrode, and the sixth power supply electrode.

3. The actuator according to claim 2,
   wherein wires are independently connected to the first power supply electrode, the second power supply electrode, the third power supply electrode, the fourth power supply electrode, the fifth power supply electrode, and the sixth power supply electrode.

4. The actuator according to claim 3,
   wherein a first coil drive signal applied to the first coil through the first power supply electrode and the second power supply electrode, and a third coil drive signal applied to the third coil through the fifth power supply electrode and the sixth power supply electrode have different waveforms.

5. The actuator according to claim 4,
   wherein the first coil drive signal and the third coil drive signal have waveforms of opposite phases, and
   wherein the first magnetic drive circuit and the third magnetic drive circuit generate the respective driving forces to drive the movable body in opposite directions in the second direction.

6. The actuator according to claim 1,
   wherein the first magnetic drive circuit, the second magnetic drive circuit, and the third magnetic drive circuit are arranged to be sequentially stacked from one side to the other side in the first direction.

7. The actuator according to claim 6,
   wherein a magnetic center position of the second magnetic drive circuit coincides with or substantially coincides with a position of the center of gravity of the movable body in the first direction, the second direction, and the third direction, and wherein a magnetic center position obtained by combining a magnetic center position of the first magnetic drive circuit and a magnetic center position of the third magnetic drive circuit coincides with or substantially coincides with the position of the center of gravity of the movable body in the first direction, the second direction, and the third direction.

8. The actuator according to claim 5, wherein the first magnetic drive circuit, the second magnetic drive circuit, and the third magnetic drive circuit are arranged to be sequentially stacked from one side to the other side in the first direction.

9. The actuator according to claim 8, wherein a magnetic center position of the second magnetic drive circuit coincides with or substantially coincides with a position of the center of gravity of the movable body in the first direction, the second direction, and the third direction, and wherein a magnetic center position obtained by combining a magnetic center position of the first magnetic drive circuit and a magnetic center position of the third magnetic drive circuit coincides with or substantially coincides with the position of the center of gravity of the movable body in the first direction, the second direction, and the third direction.

10. The actuator according to claim 4, wherein the first magnetic drive circuit, the second magnetic drive circuit, and the third magnetic drive circuit are arranged to be sequentially stacked from one side to the other side in the first direction.

11. The actuator according to claim 10, wherein a magnetic center position of the second magnetic drive circuit coincides with or substantially coincides with a position of the center of gravity of the movable body in the first direction, the second direction, and the third direction, and wherein a magnetic center position obtained by combining a magnetic center position of the first magnetic drive circuit and a magnetic center position of the third magnetic drive circuit coincides with or substantially coincides with the position of the center of gravity of the movable body in the first direction, the second direction, and the third direction.

12. The actuator according to claim 3, wherein the first magnetic drive circuit, the second magnetic drive circuit, and the third magnetic drive circuit are arranged to be sequentially stacked from one side to the other side in the first direction.

13. The actuator according to claim 12, wherein a magnetic center position of the second magnetic drive circuit coincides with or substantially coincides with a position of the center of gravity of the movable body in the first direction, the second direction, and the third direction, and wherein a magnetic center position obtained by combining a magnetic center position of the first magnetic drive circuit and a magnetic center position of the third magnetic drive circuit coincides with or substantially coincides with the position of the center of gravity of the movable body in the first direction, the second direction, and the third direction.

14. The actuator according to claim 2, wherein the first magnetic drive circuit, the second magnetic drive circuit, and the third magnetic drive circuit are arranged to be sequentially stacked from one side to the other side in the first direction.

15. The actuator according to claim 14, wherein a magnetic center position of the second magnetic drive circuit coincides with or substantially coincides with a position of the center of gravity of the movable body in the first direction, the second direction, and the third direction, and wherein a magnetic center position obtained by combining a magnetic center position of the first magnetic drive circuit and a magnetic center position of the third magnetic drive circuit coincides with or substantially coincides with the position of the center of gravity of the movable body in the first direction, the second direction, and the third direction.

* * * * *